United States Patent Office 2,772,146
Patented Nov. 27, 1956

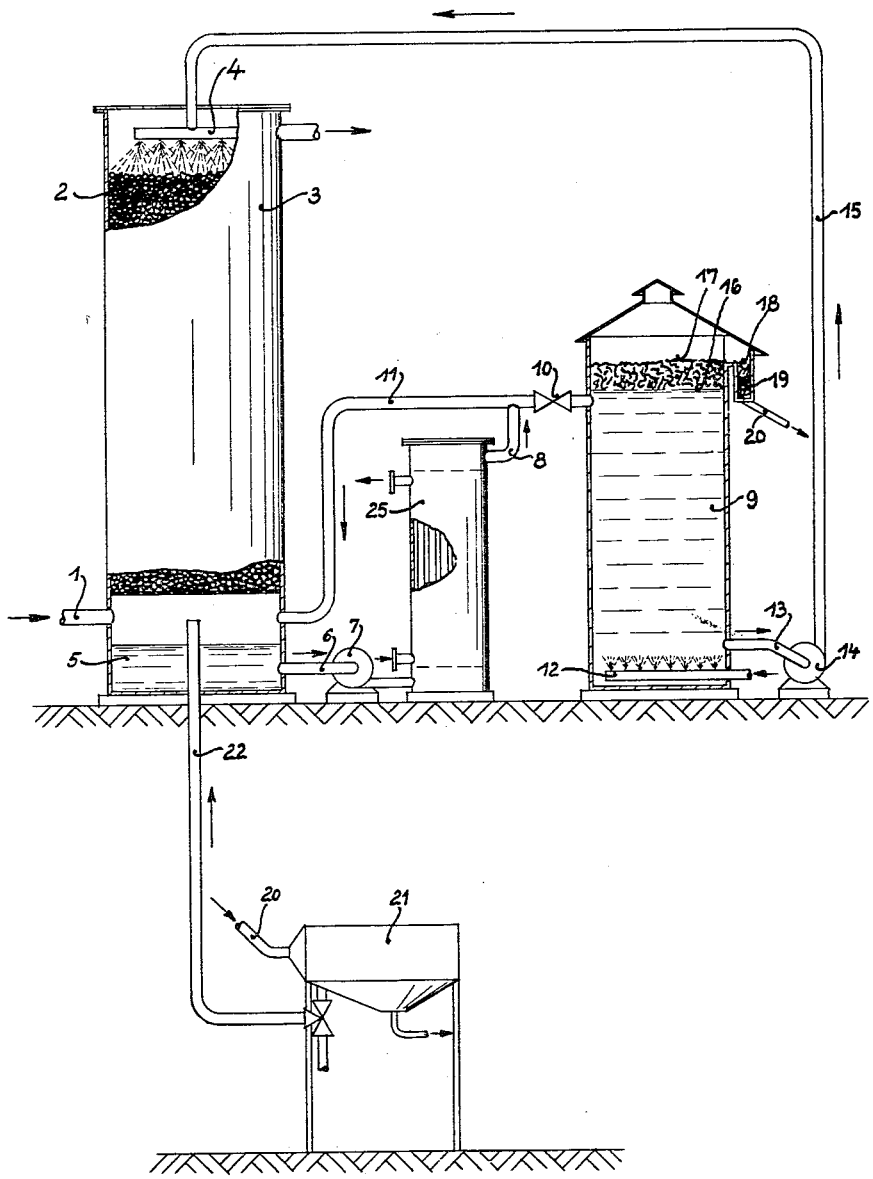

2,772,146

PROCESS FOR THE RECOVERY OF ELEMENTARY SULFUR FROM GASES CONTAINING HYDROGEN SULFIDE

Heinz Pippig, Mainz, Germany

Application September 29, 1952, Serial No. 311,980

Claims priority, application Germany October 1, 1951

4 Claims. (Cl. 23—225)

The present invention relates to the recovery of elementary sulfur from gases containing hydrogen sulfide, in particular unpurified coke oven gas.

It has been proposed already to remove the hydrogen sulfide from coke oven gas or the like by means of an alkaline or ammoniacal washing liquid containing an organic oxygen transmission agent, e. g. hydroxy-benzene or other cyclic oxy compounds. If such liquids are treated with respectively oxygen or air, the hydrogen sulfide absorbed from the gas by the washing liquid oxidizes to elementary sulfur which may be separated from the washing liquid by filtration or any other suitable means. In this process the washing liquid is kept in circulation between the gas washer and a suitable column type vessel where the hydrogen sulfide is oxidized by regeneration of the absorbing power of the washing liquid.

When treating the washing liquid enriched by hydrogen sulfide with respectively oxygen or air besides the oxidation of the hydrogen sulfide other reactions take place which lead to higher oxidation stages of the sulfur, in particular, to the formation of thiosulfate.

Now, the inventor has found that the mentioned and undesired side reactions may be essentially decreased and the yield in elementary sulfur be correspondingly increased if the washing liquid is cooled prior to or during the treatment with respectively oxygen or air by means of a cooler. During oxidation of the hydrogen sulfide to sulfur a considerable heat quantity is released by which the washing liquid is heated. This heating can reach such an extent, in particular with high outdoor temperatures that the temperature of the washing liquid may come into the range within which the mentioned side reactions will preferably take place.

By the provision according to the invention to cool the washing liquid the yield in elementary sulfur is increased and the undesired side reactions subdued.

It has been found, e. g. that at a temperature of 33–35° C. in the oxidation stage of the process the yield in elementary sulfur will drop to about 65% as referred to the amount of hydrogen sulfide absorbed and that the remaining hydrogen sulfide will oxidize to thiosulfate, thionate and partly also to sulfate. If according to the invention the temperature is, however, decreased in the oxidation stage of the process to about 20–25° C. or lower, the yield in elementary sulfur is increased to 85–90% and even higher.

Substantially, the temperature of the washing liquid in the gas washing stage of the process is of no importance for the recovery of the elementary sulfur; it is, however, advantageous not to maintain this markedly above 25° C., conveniently even lower, since the absorption of the hydrogen sulfide will either be decreased at higher temperatures or a larger quantity of liquid should be used per volume unit of the gases containing hydrogen sulfide.

Instead of cooling by means of a cooler a direct cooling may also be provided for under certain circumstances, e. g. by causing the washing liquid to be oxidized to flow over a graduation works.

The drawing shows diagrammatically an apparatus for carrying out the process according to the invention. The gas containing the hydrogen sulfide to be treated, e. g. unpurified coke oven gas, enters through the pipe 1 into the base of the washer 2 which is provided in the known manner with filler bodies (shown diagrammatically at 3).

At the top there is delivered on to the filler bodies from the distributor pipe 4 an alkaline or ammoniacal liquid absorbing hydrogen sulfide, to be described in more detail hereinafter. Gas and washing liquid meet each other over a large surface area in the filler body column 3, the liquid absorbing the hydrogen sulfide from the gas with the formation of sulfides.

The liquid charged with hydrogen sulfide collects below in the washer 2 at 5 and passes from thence through the pipe 6 to a pump 7.

This delivers the liquid through the pipe 8 to the upper end of the tower-like oxidising vessel 9. At the entry into the vessel 9 there is arranged a regulating valve 10 which is controlled by the amount of liquid in the vessel 9. The excess liquid can flow back to the washer through the pipe 11.

The vessel 9 is provided at the bottom with a perforated pipe 12 through which compressed air is introduced into the liquid in the vessel 9. In addition there is connected to the base of the vessel 9 a pipe 13 through which liquid can flow from the container 9 to the pump 14, which moves it through the pipe 15 to the top of the washer 2 to the distributing pipe 4.

The vessel 9 is so constructed that the height of the liquid column between the air pipe 12 and the level 16 amounts to about 8–9 m. The air introduced oxidizes the hydrogen sulfide or the sulfides into finely divided elementary sulfur which accumulates in the form of a foam 17 at the top of the liquid and passes over an adjustable overflow 18 into a collecting channel 19 from which a pipe 20 leads to a filtering device 21. The filtrate produced there flows through the pipe 22 for example down into the washer 2.

An aqueous solution of ammonium thiosulfate, containing about 250 g. of thiosulfate per litre and in addition about 0.5% by weight of an hydroxybenzene, e. g. hydroquinone, is used as the washing liquid. By the addition of ammonia the pH value of the solution may be kept at about 8.4–8.6. The temperature of the solution should not exceed 25°. A suitable indirect cooler 25 is arranged in the pipe 6 leading from pump 7 to oxidizer 9 in such a manner that the temperature of the liquid flowing from pump 7 to the oxidizer is decreased to about 20–25° C. or below.

The inventor has found that the formation of sulfur-oxygen-compounds decreases rapidly by keeping the temperature of the liquid inside the oxidizer below about 25° C. and that the formation of such compound ceases at a temperature of about 5° C.

The invention as hereinabove set forth is embodied in particular and manner but may be variously embodied within the scope of the claims hereinafter made:

I claim:

1. In the continuous recovery of elementary sulfur from a gas containing hydrogen sulfide by a process involving the steps of absorbing hydrogen sulfide from the gas in an alkaline washing liquid including a free oxygen-containing oxidizing agent for hydrogen sulfide by washing said gas with said washing liquid in a washing stage, thereafter treating said washing liquid with oxygen in an oxidizing stage to oxidize the absorbed hydrogen sulfide to elementary sulfur, removing said sulfur from the washing liquid and recycling the latter into said washing stage in order to absorb hydrogen sulfide from another portion of gas, the improvement which comprises maintaining the hydrogen-sulfide-enriched washing liquid within the oxidizing stage at a temperature not in excess of about 25° C. artificial cooling of said enriched liquid.

2. A process according to claim 1 wherein the temperature within the oxidation stage and of the washing liquid containing absorbed hydrogen sulfide is maintained at a temperature not greater than 25° C. by cooling said liquid prior to treating the same with oxygen.

3. A process according to claim 1 wherein the temperature within the oxidation stage and of the washing liquid containing absorbed hydrogen sulfide is maintained at a temperature not greater than 25° C. by cooling said liquid while the latter is treated with oxygen.

4. A process according to claim 1 wherein the temperature within the oxidation stage and of the washing liquid containing absorbed hydrogen sulfide is maintained at a temperature between about 5° C. and 25° C.

References Cited in the file of this patent
UNITED STATES PATENTS

| | | |
|---|---|---|
| 927,342 | Feld | July 6, 1909 |
| 1,465,601 | Eldred et al. | Aug. 21, 1923 |
| 1,700,982 | Hill et al. | Feb. 5, 1929 |
| 1,708,590 | Reeson | Apr. 9, 1929 |
| 1,792,097 | Jacobson | Feb. 10, 1931 |
| 1,822,380 | Seil | Sept. 8, 1931 |
| 1,824,104 | Sperr | Sept. 22, 1931 |
| 1,852,160 | Hansen | Apr. 5, 1932 |
| 1,866,229 | Sperr | July 5, 1932 |
| 2,043,084 | Ward | June 2, 1936 |
| 2,242,115 | Danciger | May 13, 1941 |
| 2,370,020 | Doumani | Feb. 20, 1945 |
| 2,472,473 | Fetterly | June 7, 1949 |